US010205201B2

(12) United States Patent
Park

(10) Patent No.: US 10,205,201 B2
(45) Date of Patent: Feb. 12, 2019

(54) COOLING SYSTEM FOR BATTERY

(71) Applicant: SAMSUNG SDI CO., LTD., Yongin-si, Gyeonggi-do (KR)

(72) Inventor: Juyong Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 259 days.

(21) Appl. No.: 15/136,663

(22) Filed: Apr. 22, 2016

(65) Prior Publication Data

US 2016/0322678 A1 Nov. 3, 2016

(30) Foreign Application Priority Data

Apr. 29, 2015 (KR) ........................ 10-2015-0060445

(51) Int. Cl.
| *H01M 10/613* | (2014.01) |
| *F28D 7/10* | (2006.01) |
| *F28D 7/14* | (2006.01) |
| *H01M 10/647* | (2014.01) |
| *H01M 10/6556* | (2014.01) |

(Continued)

(52) U.S. Cl.
CPC .......... *H01M 10/613* (2015.04); *F28D 7/106* (2013.01); *F28D 7/14* (2013.01); *F28F 1/003* (2013.01); *F28F 21/06* (2013.01); *H01M 10/625* (2015.04); *H01M 10/647* (2015.04); *H01M 10/6554* (2015.04); *H01M 10/6556* (2015.04); *H01M 10/6567* (2015.04); *F28F 2225/04* (2013.01); *H01M 10/6568* (2015.04)

(58) Field of Classification Search
CPC .......... H01M 10/613; H01M 10/6556; H01M 10/6567; H01M 10/625; H01M 10/647; H01M 10/6554; H01M 10/6568; F28D 7/106; F28D 7/14; F28F 21/06; F28F 1/003; F28F 2225/04
See application file for complete search history.

(56) References Cited

U.S. PATENT DOCUMENTS

| 2005/0191532 A1 | 9/2005 | Kim et al. |
| 2010/0092848 A1* | 4/2010 | Choi ................... H01M 2/1077 429/99 |

(Continued)

FOREIGN PATENT DOCUMENTS

| DE | 10-2010-024276 A1 | 1/2012 |
| EP | 1843109 | * 10/2007 |

(Continued)

OTHER PUBLICATIONS

DE102010024276MT.*
EPO Extended Search Report dated Aug. 3, 2016, for corresponding European Patent Application No. 16167778.6 (7 pages).

*Primary Examiner* — Alexander Usyatinsky
(74) *Attorney, Agent, or Firm* — Lewis Roca Rothgerber Christie LLP

(57) ABSTRACT

A cooling system for a battery reduces a cooling package space using a duplex pipe and can reinforce mechanical strength of the duplex pipe by forming reinforcement ribs in the duplex pipe. The cooling system includes a duplex pipe, and an internal unitary pipe connected to the duplex pipe and arranged at a side of a battery cell, the internal unitary pipe including an internal inlet to flow a cooling fluid into the internal unitary pipe and an internal outlet to flow the cooling fluid from the internal unitary pipe.

15 Claims, 3 Drawing Sheets

(51) Int. Cl.
*H01M 10/6567* (2014.01)
*H01M 10/6554* (2014.01)
*H01M 10/625* (2014.01)
*F28F 21/06* (2006.01)
*F28F 1/00* (2006.01)
*H01M 10/6568* (2014.01)

(56) References Cited

U.S. PATENT DOCUMENTS

| | | | |
|---|---|---|---|
| 2011/0189521 A1* | 8/2011 | Lee | H01M 2/1077 429/120 |
| 2011/0212355 A1* | 9/2011 | Essinger | H01M 2/1016 429/120 |
| 2013/0223826 A1* | 8/2013 | Bruce | F24H 9/00 392/471 |
| 2014/0083660 A1 | 3/2014 | McDermott | |
| 2014/0322572 A1* | 10/2014 | Yum | H01M 10/6569 429/83 |
| 2014/0335390 A1 | 11/2014 | Hwang et al. | |

FOREIGN PATENT DOCUMENTS

| | | |
|---|---|---|
| EP | 1843109 A2 | 10/2007 |
| KR | 10-2013-0062056 A | 6/2013 |
| KR | 10-2013-0081802 A | 7/2013 |
| KR | 10-2014-0062603 A | 5/2014 |
| WO | WO 2008/038363 * | 4/2008 |
| WO | WO 2008/038363 A1 | 4/2008 |

* cited by examiner

COOLING SYSTEM FOR BATTERY

CROSS-REFERENCE TO RELATED APPLICATION

This application claims priority to and the benefit of Korean Patent Application No. 10-2015-0060445, filed on Apr. 29, 2015 in the Korean Intellectual Property Office, the entire content of which is incorporated herein by reference.

BACKGROUND

1. Field

Aspects of embodiments of the present invention relate to a cooling system for a battery.

2. Description of the Related Art

In general, a rechargeable, reusable battery can be used as a power source for a mobile device, a hybrid vehicle, or an electric vehicle. The battery typically includes an electrode assembly and an external case for accommodating the electrode assembly and can be divided into a pouch type battery, a prismatic battery, or a cylindrical battery according to the kind of external case used.

In addition, a battery module or a battery pack can be defined by connecting a plurality of batteries to each other in series and/or in parallel. The battery module or the battery pack may be accommodated in a housing or a case to then be electrically connected to an internal or external battery monitoring board.

Further, when the battery module or the battery pack is used as a power source of a hybrid vehicle or an electric vehicle, a cooling system is required to prevent or substantially prevent the battery from being deteriorated.

SUMMARY

According to an aspect of embodiments of the present invention, a cooling system for a battery can reduce a cooling package space using a duplex pipe.

According to another aspect of embodiments of the present invention, a cooling system for a battery can reinforce mechanical strength of the duplex pipe by forming reinforcement ribs in the duplex pipe.

The above and other aspects of embodiments of the present invention will be described in or be apparent from the following description of some exemplary embodiments.

According to one or more embodiments of the present invention, a cooling system for a battery includes a duplex pipe, and an internal unitary pipe connected to the duplex pipe and arranged at a side of a battery cell, the internal unitary pipe including an internal inlet to flow a cooling fluid into the internal unitary pipe and an internal outlet to flow the cooling fluid from the internal unitary pipe.

The duplex pipe may include an internal pipe, and an external pipe outside the internal pipe. The internal inlet of the internal unitary pipe may be connected to the internal pipe and the internal outlet of the internal unitary pipe may be connected to the external pipe, or the internal outlet of the internal unitary pipe may be connected to the internal pipe and the internal inlet of the internal unitary pipe may be connected to the external pipe. The external pipe may surround the internal pipe.

The duplex pipe may include an internal pipe; an external pipe outside the internal pipe; and reinforcement ribs between the internal pipe and the external pipe.

The reinforcement ribs may be arranged in a lengthwise direction of the duplex pipe. The external pipe may surround the internal pipe.

The duplex pipe may have a bent shape.

The cooling system may further include a heat exchanger connected to the duplex pipe and inducing and discharging the cooling fluid. The cooling system may further include a cooling plate at the side of the battery cell, and the internal unitary pipe may be arranged in the cooling plate.

The cooling system may further include an external unitary pipe connected to the duplex pipe and arranged in the heat exchanger, the external unitary pipe including an external outlet to flow the cooling fluid from the external unitary pipe and an external inlet to flow the cooling fluid into the external unitary pipe.

The external outlet of the external unitary pipe may be connected to the internal pipe and the external inlet of the external unitary pipe may be connected to the external pipe, or the external inlet of the external unitary pipe may be connected to the internal pipe and the external outlet of the external unitary pipe may be connected to the external pipe.

The duplex pipe may include an internal pipe; an external pipe at an exterior side of the internal pipe; and an internal socket connected to one side of the external pipe. The internal inlet of the internal unitary pipe may be connected to one side of the internal pipe and the internal outlet of the internal unitary pipe may be connected to the internal socket, or the internal outlet of the internal unitary pipe may be connected to one side of the internal pipe and the internal inlet of the internal unitary pipe may be connected to the internal socket. The external pipe may surround the internal pipe.

The cooling system may further include an external socket connected to the other side of the external pipe. The external outlet of the external unitary pipe may be connected to the other side of the internal pipe and the external inlet of the external unitary pipe may be connected to the external socket or the external inlet of the external unitary pipe may be connected to the internal pipe and the external outlet of the external unitary pipe may be connected to the external socket.

As described above, in the battery cooling system according to one or more embodiments of the present invention, a cooling package space can be minimized or reduced using a duplex pipe. In one or more exemplary embodiments of the present invention, a unitary pipe for inducing a cooling fluid and a unitary pipe for discharging the cooling fluid are incorporated into a duplex pipe, thereby minimizing or reducing the cooling package space for accommodating the duplex pipe. Further, the number of brackets for fixing the duplex pipe may also be reduced, thereby further reducing the cooling package space.

In addition, in the battery cooling system according to one or more embodiments of the present invention, mechanical strength of the duplex pipe can be secured by forming reinforcement ribs in the duplex pipe. In one or more exemplary embodiments of the present invention, the duplex pipe includes an internal pipe and an external pipe surrounding the internal pipe. The duplex pipe further includes a plurality of reinforcement ribs formed between the internal pipe and the external pipe in a lengthwise direction, thereby improving the strength of the duplex pipe.

Further, in the battery cooling system according to one or more embodiments of the present invention, like a unitary pipe, the duplex pipe can be fabricated in an extrusion tube process or an injection tube process so as to be bent in various directions, thereby accommodating the duplex pipe in the cooling package space having various structures.

BRIEF DESCRIPTION OF THE DRAWINGS

The above and other aspects and features of embodiments of the present invention will become more apparent by describing in further detail some exemplary embodiments thereof with reference to the attached drawings, in which.

DETAILED DESCRIPTION

Figure 1A:
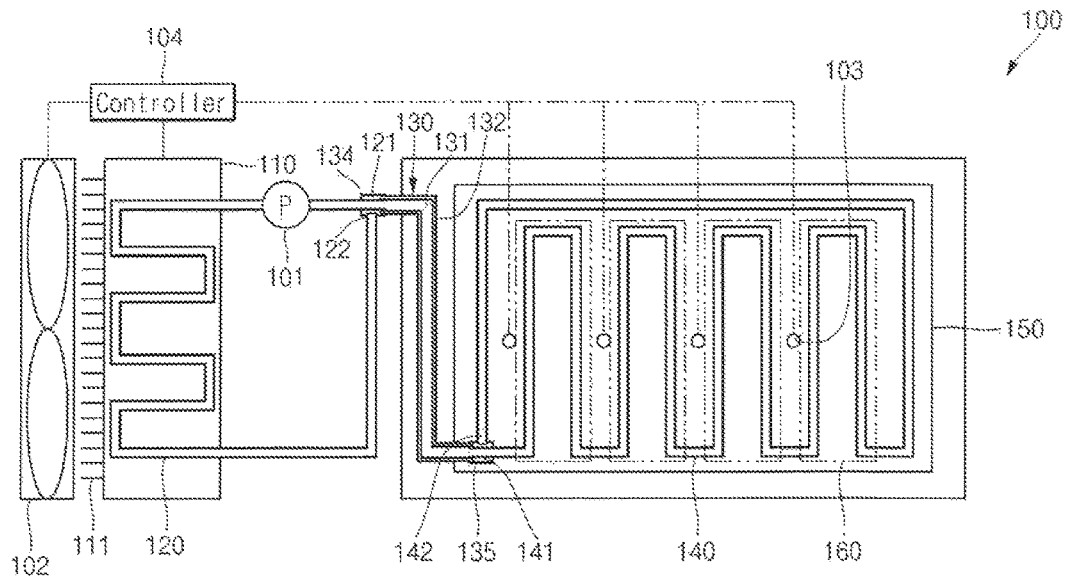
FIGS. 1A and 1B are schematic views illustrating a cooling system for a battery according to an embodiment of the present invention.

Hereinafter, some example embodiments of the present invention will be described in further detail with reference to the accompanying drawings.

Various aspects of embodiments of the present invention may be embodied in many different forms and should not be construed as being limited to the example embodiments set forth herein. Rather, these example embodiments of the disclosure are provided so that this disclosure will be thorough and complete and will convey various aspects of the disclosure to those skilled in the art. As those skilled in the art would realize, the described embodiments may be modified in various different ways, all without departing from the spirit or scope of the present invention. Accordingly, the drawings and description are to be regarded as illustrative in nature and not restrictive.

In the drawings, thicknesses of layers and regions may be exaggerated for clarity. Like numbers refer to like elements throughout. As used herein, the term "and/or" includes any and all combinations of one or more of the associated listed items. In addition, it will be understood that when an element "A" is referred to as being "connected to" an element "B," the element "A" can be directly connected to the element "B" or an intervening element "C" may be present between the element "A" and the element "B" such that the element "A" and the element "B" are indirectly connected to each other by the intervening element "C."

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," etc. may be used herein to describe various elements, components, regions, layers and/or sections, these elements, components, regions, layers and/or sections should not be limited by these terms. These terms are used only to distinguish one element, component, region, layer and/or section from another element, component, region, layer and/or section. Thus, for example, a first element, component, region, layer and/or section discussed below could be termed a "second" element, component, region, layer and/or section without departing from the teachings of the present invention.

In addition, the battery cell described in the specification of the present invention may be a rechargeable battery cell, such as a lithium ion battery, lithium polymer battery, or a lithium ion polymer battery, and may be a large-sized battery, such as employed to an electric vehicle, a hybrid vehicle, an electric bicycle and/or an electric motor bike, but aspects of the present invention are not limited thereto.

In addition, the duplex pipe described in the specification of the present invention may be made of a thermoplastic resin, such as polyethylene (PE), polypropylene (PP), polystyrene (PS), polyvinyl chloride (PVC), acrylonitrile butadien styrene resin (ABS), acrylonitrile styrene resin (AN), polymethyl methacrylate (PMMA), polyamide (PA), polyacetal (POM), polycarbonate (PC), polyethylene terephthalate (PET), polybutylene terephthalate (PBT), denatured polyphenylene ether, or fluorine resin, or a thermocurable resin such as phenol resin (PF), urea resin (UF), melamine resin (MF), unsaturated polyester resin (UP), epoxy resin (EP), polyurethane resin (PUR), but aspects of the present invention are not limited thereto.

In addition, in the specification of the present invention, it may be described that a cooling fluid is induced through an inlet and the cooling fluid is discharged through an outlet, or vice versa. However, the present invention is not intended to be limited, and in embodiments of the present invention, the cooling fluid may simply be flowed through an inlet and/or an outlet.

Figure 1B:
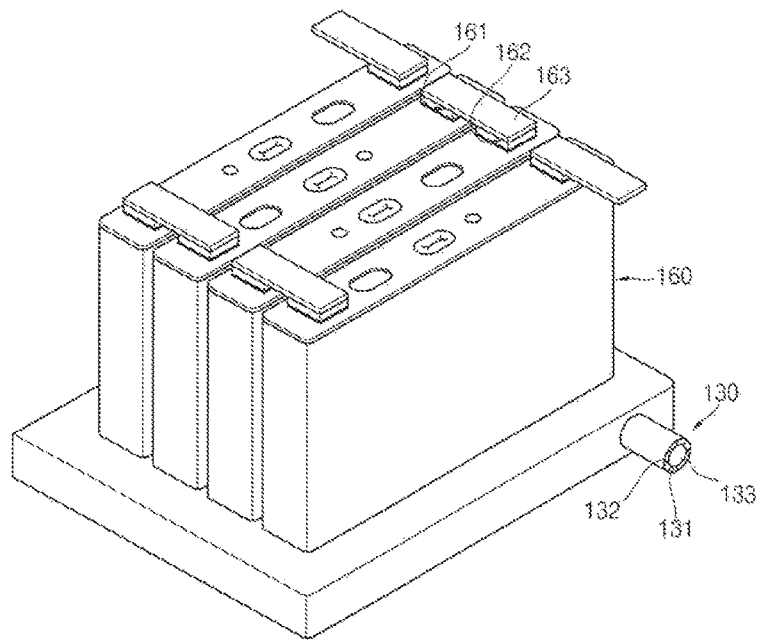

FIGS. 1A and 1B are schematic views illustrating a cooling system 100 for a battery, or a battery cooling system, according to an embodiment of the present invention.

As illustrated in FIGS. 1A and 1B, the battery cooling system 100 according to an embodiment of the present invention includes a heat exchanger 110, an external unitary pipe 120 installed in the heat exchanger 110, a duplex pipe 130 connected to the external unitary pipe 120, an internal unitary pipe 140 connected to the duplex pipe 130, and a cooling plate 150 having the internal unitary pipe 140 installed thereon or therein.

Here, a plurality of battery cells 160 may be arranged on the cooling plate 150 to be cooled. In one embodiment, a fluid pump 101 for pumping a cooling fluid may further be provided such as between the external unitary pipe 120 and the duplex pipe 130. Further, a cooling fan 102 may be installed at one side of the heat exchanger 110 to improve heat exchange efficiency, and, in one embodiment, a temperature sensor 103 for sensing temperatures of the battery cells 160 may be installed at one side of the battery cells 160.

The battery cooling system 100 according to an embodiment of the present invention may further include a controller 104 controlling the fluid pump 101 and/or the cooling fan 102 according to temperatures of the battery cells 160 sensed by the temperature sensor 103.

The heat exchanger 110 accommodates a cooling fluid (e.g., water or oil) and may include a plurality of cooling fins 111 provided on its surface to rapidly cool the cooling fluid. In an exemplary embodiment, the heat exchanger 110 may be a radiator installed in a vehicle (e.g., an automotive vehicle). That is, according to one or more embodiments of the present invention, the cooling fluid supplied to the duplex pipe 130 and the internal unitary pipe 140 may be cooled water or cooling fluid obtained from a radiator of an automotive vehicle. However, in other embodiments of the present invention, a kind of the heat exchanger 110 and the cooling fluid is not limited thereto.

The external unitary pipe 120, in one embodiment, is installed in the heat exchanger 110 in a meandering type. The external unitary pipe 120 includes an external outlet 121 and an external inlet 122, which are connected to the duplex pipe 130, respectively. The external unitary pipe 120 induces, or flows, the cooling fluid that is to be heat-exchanged by the heat exchanger 110 from the duplex pipe 130 while the heated cooling fluid is discharged from the cooling plate 150 through the duplex pipe 130.

The duplex pipe 130 is installed between the external unitary pipe 120 and the internal unitary pipe 140. That is, the duplex pipe 130 functions to mechanically and/or thermally connect the external unitary pipe 120 installed in the heat exchanger 110 and the internal unitary pipe 140 installed in the cooling plate 150 to each other. In other words, the duplex pipe 130 concurrently (e.g., simultaneously) functions to induce, or flow, the cooling fluid cooled from the heat exchanger 110 and discharge, or flow, the cooled cooling fluid to the internal unitary pipe 140, and concurrently (e.g., simultaneously) functions to induce, or flow, the cooling fluid heated from the internal unitary pipe 140 and discharge, or flow, the heated cooling fluid to the external unitary pipe 120 and the heat exchanger 110.

The duplex pipe 130 concurrently (e.g., simultaneously) induces and discharges the cooling fluid, thereby minimizing or reducing a cooling package space. In one embodiment, the duplex pipe 130 includes an internal pipe 131, an external pipe 132 installed at an exterior side of (e.g., surrounding) the internal pipe 131, reinforcement ribs 133 interposed between the internal pipe 131 and the external pipe 132, an external socket 134 installed at one side of the external pipe 132, and an internal socket 135 installed at the other side of the external pipe 132. Systemically connected relationships between each of the components and operations of the components will be described further below. However, in other embodiments, the external socket 134 and the internal socket 135 may not be provided.

The duplex pipe 130 may be linear or bent at least one time, or having a shape having at least one bend, and may be freely installed in a package space (e.g., a predetermined package space). The duplex pipe 130, in one or more embodiments, is made of a plastic-based material having a relatively low heat transfer coefficient so as to prevent or substantially prevent the induced and/or discharged cooling fluid from being thermally affected by each other. In addition, since the external unitary pipe 120 and/or the internal unitary pipe 140 may have a higher heat transfer coefficient than the duplex pipe 130, a heat exchange efficiency can be improved by the external unitary pipe 120 and/or the internal unitary pipe 140.

The internal unitary pipe 140 includes an internal inlet 141 and an internal outlet 142, which are connected to the duplex pipe 130, to induce, or flow, the cooling fluid and to discharge, or flow, the cooling fluid, respectively. That is, the internal inlet 141 and the internal outlet 142 of the internal unitary pipe 140 are connected to the duplex pipe 130 at the internal socket 135. In other words, the cooling fluid is induced, or flowed, from the internal inlet 141 of the internal unitary pipe 140 and is discharged, or flowed, from the internal outlet 142. The internal unitary pipe 140 may be made of at least one material having a relatively high heat transfer efficiency, such as aluminum, an aluminum alloy, copper, a copper alloy, stainless steel and equivalents thereof; however, embodiments of the present invention are not limited thereto.

The cooling plate 150, in one embodiment, is shaped as a substantially plate-shaped hexahedron, and has a planar top surface and a planar bottom surface. The plurality of battery cells 160 are positioned in a row on the planar top surface of the cooling plate 150, and the meandering type internal unitary pipe 140 is positioned between the top and bottom surfaces of the cooling plate 150. The cooling plate 150 may be made of at least one material having a relatively high heat transfer efficiency, such as aluminum, an aluminum alloy, copper, a copper alloy, stainless steel and equivalents thereof; however, embodiments of the present invention are not limited thereto.

In the above-described manner, the battery cooling system 100 according to one or more embodiments of the present invention concurrently (e.g., simultaneously) performs inducing and/or discharging of the cooling fluid using one duplex pipe 130, thereby minimizing or reducing the cooling package space. In addition, the configuration of the duplex pipe 130 simplifies the cooling fluid inducing and/or discharging mechanisms.

In addition, according to one or more embodiments of the present invention, the controller 104 senses temperatures of the battery cells 160 using the temperature sensor 103, and if the temperatures of the battery cells 160 exceed a first reference temperature the controller 104 operates the fluid pump 101. Therefore, the cooling fluid from the heat exchanger 110 and the external unitary pipe 120 is supplied to the internal unitary pipe 140 through the duplex pipe 130. Accordingly, heat energy is absorbed from the cooling plate 150 surrounding the internal unitary pipe 140, thereby cooling the battery cells 160. In addition, in one embodiment, if the temperatures of the battery cells 160 exceed a second reference temperature, the controller 104 operates the cooling fan 102. Therefore, a heat exchange efficiency of the heat exchanger 110 is improved, thereby further increasing cooling efficiency of the battery cells 160. Here, the second reference temperature may be higher than the first reference temperature.

As shown in FIG. 1B, in one embodiment, a bus bar 163 connects terminals 161 and 162 of the battery cells 160 in series or in parallel.

Figure 2A:
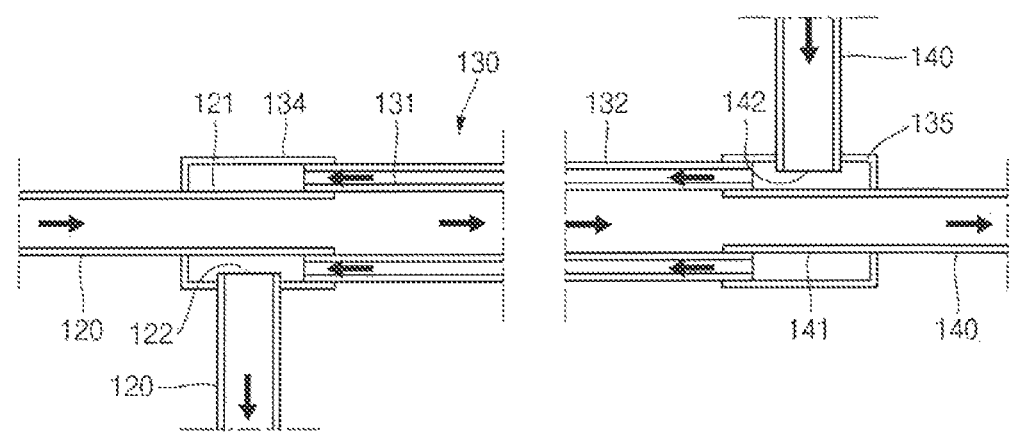
FIGS. 2A and 2B are a partial sectional view and a partial perspective view, respectively, illustrating a duplex pipe of a cooling system for a battery according to an embodiment of the present invention.
Figure 2B:
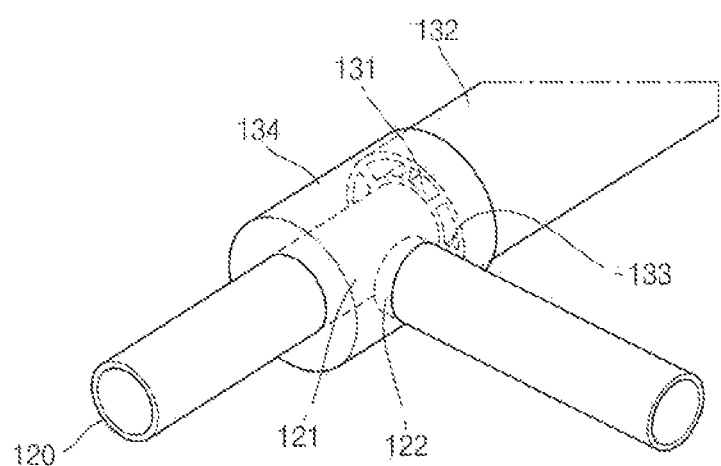

FIGS. 2A and 2B are a partial sectional view and a partial perspective view, respectively, illustrating a duplex pipe of a cooling system for a battery according to an embodiment of the present invention.

As illustrated in FIGS. 2A and 2B, the duplex pipe 130 includes the internal pipe 131 and the external pipe 132. In addition, the duplex pipe 130 may further include the external socket 134 and the internal socket 135.

The internal pipe 131 has a smaller diameter than the external pipe 132. The external outlet 121 or the external inlet 122 of the external unitary pipe 120 is connected to one side of the internal pipe 131, and the internal inlet 141 or the internal outlet 142 of the internal unitary pipe 140 is connected to the other side of the internal pipe 131. In the above-described manner, the internal pipe 131 allows the cooling fluid to be induced or discharged from the external unitary pipe 120 to the internal unitary pipe 140 and to be discharged or induced from the internal unitary pipe 140 to the external unitary pipe 120.

The external pipe 132 has a larger diameter than the internal pipe 131 and is positioned at an exterior side of the internal pipe 131. Therefore, a space or a gap having a size (e.g., a predetermined size) is formed between the internal pipe 131 and the external pipe 132, and the cooling fluid is allowed to be induced or discharged through the space or the gap. In addition, the external inlet 122 or the external outlet 121 of the external unitary pipe 120 is connected to one side of the external pipe 132, and the internal outlet 142 or the internal inlet 141 of the internal unitary pipe 140 is connected to the other side of the external pipe 132. In the above-described manner, the external pipe 132 allows the cooling fluid to be discharged or induced from the interned unitary pipe 140 to the external unitary pipe 120. Conversely, the cooling fluid is induced or discharged from the external unitary pipe 120 to the internal unitary pipe 140.

In one embodiment, the external socket 134 is connected to one side of the external pipe 132 while generally surrounding the external outlet 121 of the external unitary pipe 120. That is, the external outlet 121 of the external unitary pipe 120 is directly connected to the internal pipe 131 of the duplex pipe 130, and the external socket 134 is positioned at the exterior side of the external pipe 132. The external socket 134 has a hollow inside, and the external inlet 122 of the external unitary pipe 120 is connected to a side portion of the external socket 134.

In the above-described manner, the cooling fluid is discharged to the internal pipe 131 of the duplex pipe 130 through the external outlet 121 of the external unitary pipe 120, and is induced from the external pipe 132 of the duplex pipe 130 through the external inlet 122 of the external unitary pipe 120 coupled to the external socket 134.

Conversely, the cooling fluid may be induced from the internal pipe 131 of the duplex pipe 130 through the external outlet 121 of the external unitary pipe 120 and may be discharged to the external pipe 132 of the duplex pipe 130 through the external inlet 122 of the external unitary pipe 120 coupled to the external socket 134.

The internal socket 135 is connected to the other side of the external pipe 132 while generally surrounding the internal inlet 141 of the internal unitary pipe 140. That is, the internal inlet 141 of the internal unitary pipe 140 is directly connected to the internal pipe of the duplex pipe 130. The internal socket 135 is positioned at the duplex pipe 130 and is connected to one side of the external pipe 132. The internal socket 135 has a hollow inside and the internal outlet 142 of the internal unitary pipe 140 is connected side portion of the internal socket 135.

In the above-described manner, the cooling fluid is induced to the internal inlet 141 of the internal unitary pipe 140 through the internal pipe 131 of the duplex pipe 130 and is discharged to the external pipe 132 of the duplex pipe 130 through the internal outlet 142 of the internal unitary pipe 140 coupled to the internal socket 135.

Conversely, the cooling fluid may be induced from the internal inlet 141 of the internal unitary pipe 140 to the internal pipe 131 of the duplex pipe 130 and may be discharged to the external pipe 132 of the duplex pipe 130 through the internal outlet 142 of the internal unitary pipe 140 coupled to the internal socket 135.

In the illustrated embodiment, the external socket 134 and the internal socket 135 have been shown and described; however, in other embodiments they may not be provided. That is, the external pipe 132 of the duplex pipe 130 may have a region provided in the form of the external socket 134 and the other region provided in the form of the internal socket 135, and the external socket 134 and the internal socket 135 may not be provided.

In the above-described manner, the battery cooling system 100 according to an embodiment of the present invention may concurrently (e.g., simultaneously) performs inducing and discharging of the cooling fluid using one duplex pipe 130, thereby minimizing or reducing the cooling package space.

Figure 3A:
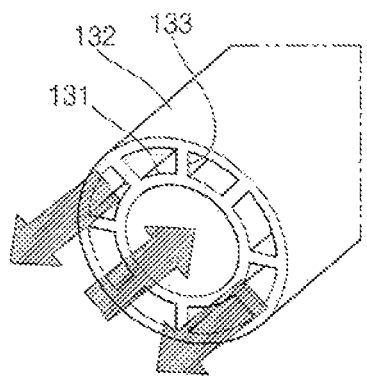
FIGS. 3A and 3B are a partial perspective view and a sectional view, respectively, illustrating reinforcement ribs of a duplex pipe of a cooling system for a battery according to an embodiment of the present invention.
Figure 3B:
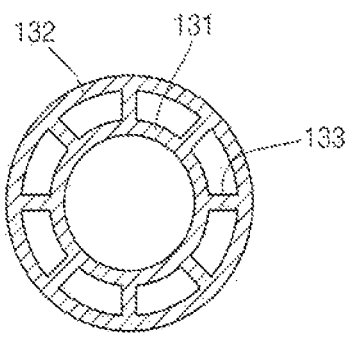

FIGS. 3A and 3B are a partial perspective view and a sectional view, respectively, illustrating the reinforcement ribs 133 of the duplex pipe 130 of the cooling system 100 for a battery according to an embodiment of the present invention.

As illustrated in FIGS. 3A and 3B, in the battery cooling system 100 according to an embodiment of the present invention, the duplex pipe 130 may further include one or more reinforcement ribs 133 interposed between the internal pipe 131 and the external pipe 132. The reinforcement ribs 133 are formed in a lengthwise direction of the duplex pipe 130, that is, in a normal direction from the internal pipe 131 to the external pipe 132. The cooling fluid may be induced or discharged through a space or a gap defined by the internal pipe 131, the external pipe 132, and the reinforcement ribs 133.

As described above, the battery cooling system 100 according to an embodiment of the present invention further includes the reinforcement ribs 133 for maintaining a space or a gap between the internal pipe 131 and the external pipe 132 of the duplex pipe 130, thereby securing a fluid path of the cooling fluid and improving mechanical strength of the duplex pipe 130.

Figure 4:
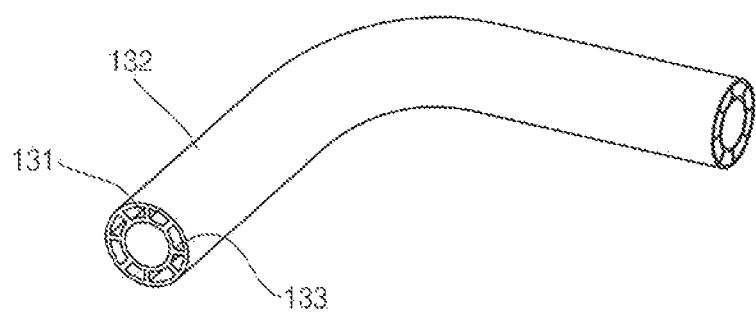
FIG. 4 is a perspective view illustrating a bent duplex pipe of a cooling system for a battery according to an embodiment of the present invention.

FIG. 4 is a perspective view illustrating a bent duplex pipe 130 of the cooling system 100 for a battery according to an embodiment of the present invention.

As illustrated in FIG. 4, the duplex pipe 130 according to an embodiment of the present invention may be bent at least one time, or have a bent shape having at least one bend. That is, the duplex pipe 130 may have one or more bends along a lengthwise direction. The duplex pipe 130 according to one or more embodiments of the present invention may be fabricated by an extrusion tube process or an injection tube process, like the external unitary pipe 120 and/or the internal unitary pipe 140. The duplex pipe 130 according to one or more embodiments of the present invention may be bent in various manners, thereby allowing the duplex pipe 130 to be installed in various package spaces.

Table 1 below shows comparison of required package spaces in cases of using two unitary pipes and using a single duplex pipe.

Here, each of the two unitary pipes has an inner diameter of 10 mm, the internal pipe of the duplex pipe has an inner diameter of 10 mm, and the external pipe of the duplex pipe has a diameter of 18.5 mm. In addition, with regard to fluid path areas, the inlet and outlet of each of the unitary pipes are both 78.5 mm$^2$ and the inlet and outlet of the duplex pipe are 78.5 mm$^2$ and 82.4 mm$^2$, respectively.

TABLE 1

|  |  | Unitary pipe | Duplex pipe |
|---|---|---|---|
| Inner diameter (mm) |  | 10 | 10 |
| Fluid path area | Inlet (mm$^2$) | 78.5 | 78.5 |
|  | Outlet (mm$^2$) | 78.5 | 82.4 |
| Required package space□ (mm$^2$) |  | 420 | 268 |

As confirmed from Table 1, in the case of using two unitary pipes, the required package space was 420 mm$^2$, and in the case of using the duplex pipe in the battery cooling system according to an embodiment of the present invention, the required package space was 268 mm$^2$. Therefore, the battery cooling system according to one or more embodiments of the present invention has a markedly reduced package space required in connecting the external pipe and the internal unitary pipe to each other.

While the battery cooling system according to the present invention has been particularly shown and described with reference to some exemplary embodiments thereof, it will be understood by those of ordinary skill in the art that various changes in form and details may be made without departing from the spirit and scope of the present invention as defined by the following claims and equivalents thereof.

What is claimed is:

1. A cooling system for a battery comprising:
   a duplex pipe; and
   an internal unitary pipe connected to the duplex pipe and arranged at a side of a battery cell, the internal unitary pipe including an internal inlet to flow a cooling fluid into the internal unitary pipe and an internal outlet to flow the cooling fluid from the internal unitary pipe, wherein the internal unitary pipe has a higher heat transfer coefficient than the duplex pipe, wherein the duplex pipe comprises:
   an internal pipe; and
   an external pipe outside the internal pipe,
   wherein the internal inlet of the internal unitary pipe is connected to the internal pipe and the internal outlet of the internal unitary pipe is connected to the external pipe, or the internal outlet of the internal unitary pipe is connected to the internal pipe and the internal inlet of the internal unitary pipe is connected to the external pipe; and
   a heat exchanger connected to the duplex pipe and configured to flow the cooling fluid therein.

2. The cooling system of claim 1, further comprising an external unitary pipe connected to the duplex pipe and arranged in the heat exchanger, the external unitary pipe including an external outlet to flow the cooling fluid from the external unitary pipe and an external inlet to flow the cooling fluid into the external unitary pipe.

3. The cooling system of claim 2, wherein the external outlet of the external unitary pipe is connected to the internal pipe and the external inlet of the external unitary pipe is connected to the external pipe, or the external inlet of the external unitary pipe is connected to the internal pipe and the external outlet of the external unitary pipe is connected to the external pipe.

4. The cooling system of claim 1, wherein the external pipe surrounds the internal pipe.

5. The coding system of claim 1, wherein the duplex pipe comprises: the internal pipe; the external pipe outside the internal pipe; and reinforcement ribs between the internal pipe and the external pipe.

6. The cooling system of claim 5, wherein the reinforcement ribs are arranged in a lengthwise direction of the duplex pipe.

7. The cooling system of claim 5, wherein the external pipe surrounds the internal pipe.

8. The cooling system of claim 1, wherein the duplex pipe has a bent shape.

9. The cooling system of claim 1, wherein the duplex pipe comprises:
   the internal pipe;
   the external pipe at an exterior side of the internal pipe; and an internal socket connected to one side of the external pipe,
   wherein the internal inlet of the internal unitary pipe is connected to one side of the internal pipe and the internal outlet of the internal unitary pipe is connected to the internal socket, or the internal outlet of the internal unitary pipe is connected to one side of the internal pipe and the internal inlet of the internal unitary pipe is connected to the internal socket.

10. The cooling system of claim 9, further comprising an external unitary pipe connected to the duplex pipe, the external unitary pipe including an external outlet to flow the cooling fluid from the external unitary pipe and an external inlet to flow the cooling fluid into the external unitary pipe.

11. The cooling system of claim 10, further comprising an external socket connected to another side of the external pipe opposite the one side of the external pipe, wherein the external outlet of the external unitary pipe is connected to another side of the internal pipe opposite the one side of the internal pipe and the external inlet of the external unitary pipe is connected to the external socket, or the external inlet of the external unitary pipe is connected to the internal pipe and the external outlet of the external unitary pipe is connected to the external socket.

12. The cooling system of claim 9, wherein the external pipe surrounds the internal pipe.

13. The cooling system of claim 1, further comprising a cooling plate at the side of the battery cell, wherein the internal unitary pipe is arranged in the cooling plate.

14. The cooling system of claim 1, wherein the duplex pipe is made of a plastic-based material.

15. The cooling system of claim 2, wherein the external unitary pipe has a higher heat transfer coefficient than the duplex pipe.

* * * * *